United States Patent
Fukuta et al.

(10) Patent No.: US 10,104,613 B2
(45) Date of Patent: Oct. 16, 2018

(54) MOBILE COMMUNICATION METHOD AND RADIO TERMINAL

(71) Applicant: KYOCERA CORPORATION, Kyoto (JP)

(72) Inventors: Noriyoshi Fukuta, Kanagawa (JP); Masato Fujishiro, Kanagawa (JP); Chiharu Yamazaki, Kanagawa (JP); Hiroyuki Adachi, Kanagawa (JP); Atsuhisa Inakoshi, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/470,723

(22) Filed: Aug. 27, 2014

(65) Prior Publication Data

US 2015/0023238 A1   Jan. 22, 2015

Related U.S. Application Data

(63) Continuation of application No. 13/438,601, filed on Apr. 3, 2012, now abandoned.

(Continued)

(51) Int. Cl.
*H04W 52/02* (2009.01)
*H04L 5/00* (2006.01)
(Continued)

(52) U.S. Cl.
CPC ....... *H04W 52/0216* (2013.01); *H04L 5/0096* (2013.01); *H04W 24/02* (2013.01);
(Continued)

(58) Field of Classification Search
None
See application file for complete search history.

(56) References Cited

U.S. PATENT DOCUMENTS 7,957,360 B2   6/2011  Suzuki et al.
8,121,634 B2 *  2/2012  Aoyama et al. ........... 455/550.1
(Continued)

FOREIGN PATENT DOCUMENTS

EP   2037595 A1   3/2009
EP   2104276 A1   9/2009
(Continued)

OTHER PUBLICATIONS

JP Office Action; "Notice of Reasons for Rejection"; Japanese Patent Application No. 2013-508656; dated Oct. 8, 2013.
(Continued)

*Primary Examiner* — Gregory B Sefcheck
(74) *Attorney, Agent, or Firm* — Studebaker & Brackett PC

(57) ABSTRACT

A mobile communication method, which configures a DRX cycle having an On duration in which a downlink signal transmitted from a serving base station is to be monitored and an Off duration other than the On duration in an RRC connected state where an RRC connection is established between a radio terminal and a radio base station, the mobile communication method comprising: a step A of transmitting, from the radio terminal to the radio base station, a timing adjustment request uplink signal through an uplink control channel, even when a radio resource of an uplink data channel has not been assigned in a case where the DRX cycle is configured; and a step B of transmitting, from the radio base station to the radio terminal, transmission timing correction information of an uplink signal, in response to the timing adjustment request uplink signal.

3 Claims, 8 Drawing Sheets

Related U.S. Application Data

(60) Provisional application No. 61/471,321, filed on Apr. 4, 2011.

(51) Int. Cl.
*H04W 24/02* (2009.01)
*H04W 72/04* (2009.01)
*H04W 76/28* (2018.01)

(52) U.S. Cl.
CPC ..... *H04W 52/0209* (2013.01); *H04W 72/042* (2013.01); *H04W 76/28* (2018.02); *Y02D 70/1224* (2018.01); *Y02D 70/1262* (2018.01); *Y02D 70/164* (2018.01); *Y02D 70/24* (2018.01)

(56) References Cited

U.S. PATENT DOCUMENTS

| | | | |
|---|---|---|---|
| 8,213,944 B2 | 7/2012 | Hedberg | |
| 8,229,432 B2 | 7/2012 | Fox et al. | |
| 8,229,434 B2 | 7/2012 | Kazmi et al. | |
| 8,285,346 B2* | 10/2012 | Fodor et al. | 455/574 |
| 8,320,287 B2 | 11/2012 | Cai et al. | |
| 8,422,416 B2 | 4/2013 | Park et al. | |
| 8,423,036 B2* | 4/2013 | Ahluwalia | 455/450 |
| 8,441,973 B2* | 5/2013 | Peisa | H04W 52/0225 370/311 |
| 8,452,244 B2* | 5/2013 | Ren | 455/115.1 |
| 8,526,420 B2* | 9/2013 | Weng et al. | 370/350 |
| 8,548,524 B2* | 10/2013 | Aoyama et al. | 455/561 |
| 8,554,163 B2 | 10/2013 | Deshpande et al. | |
| 8,565,750 B2 | 10/2013 | Fischer | |
| 8,571,091 B2* | 10/2013 | Dalsgaard et al. | 375/219 |
| 8,588,800 B2 | 11/2013 | Iwamura et al. | |
| 8,606,281 B2 | 12/2013 | Kaukoranta et al. | |
| 8,626,167 B2 | 1/2014 | Futaki et al. | |
| 8,804,546 B2* | 8/2014 | Tenny et al. | 370/252 |
| 9,743,352 B2* | 8/2017 | Hoglund | H04W 52/0216 |
| 2007/0211745 A1 | 9/2007 | Deshpande et al. | |
| 2007/0253399 A1 | 11/2007 | Deshpande et al. | |
| 2007/0297438 A1 | 12/2007 | Meylan et al. | |
| 2008/0181127 A1 | 7/2008 | Terry et al. | |
| 2008/0186892 A1 | 8/2008 | Damnjanovic | |
| 2008/0186893 A1* | 8/2008 | Kolding et al. | 370/311 |
| 2009/0186614 A1 | 7/2009 | Aoyama et al. | |
| 2009/0239476 A1 | 9/2009 | Womack et al. | |
| 2009/0279467 A1* | 11/2009 | Ji | 370/311 |
| 2010/0113054 A1 | 5/2010 | Iwamura et al. | |
| 2010/0135176 A1* | 6/2010 | Kazmi et al. | 370/252 |
| 2011/0003603 A1 | 1/2011 | Park et al. | |
| 2011/0007681 A1 | 1/2011 | Park et al. | |
| 2011/0044220 A1 | 2/2011 | Park et al. | |
| 2011/0140208 A1 | 6/2011 | Raynor et al. | |
| 2011/0158853 A1 | 6/2011 | Raynor et al. | |
| 2011/0182224 A1 | 7/2011 | Ishii | |
| 2011/0319116 A1 | 12/2011 | Iwamura et al. | |
| 2012/0014343 A1 | 1/2012 | Womack et al. | |
| 2012/0099502 A1 | 4/2012 | Park et al. | |
| 2012/0100896 A1 | 4/2012 | Aoyama et al. | |
| 2012/0134331 A1 | 5/2012 | Park et al. | |
| 2012/0176949 A1 | 7/2012 | Meylan et al. | |
| 2012/0263088 A1 | 10/2012 | Terry et al. | |
| 2012/0322515 A1* | 12/2012 | Hwang et al. | 455/574 |
| 2013/0208640 A1 | 8/2013 | Park et al. | |
| 2014/0036786 A1* | 2/2014 | Kazmi et al. | 370/329 |
| 2014/0064173 A1 | 3/2014 | Meylan et al. | |
| 2014/0226542 A1* | 8/2014 | Gupta et al. | 370/280 |
| 2015/0043403 A1* | 2/2015 | Martinez Tarradell et al. | 370/311 |

FOREIGN PATENT DOCUMENTS

| | | |
|---|---|---|
| JP | 2005-260906 A | 9/2005 |
| JP | 2010-517481 A | 5/2010 |
| KR | 2009-0033327 A | 4/2009 |
| KR | 2011-0005760 A | 1/2011 |
| WO | 2008/001726 A1 | 1/2008 |
| WO | 2010004115 A1 | 1/2010 |
| WO | 2010/018818 A1 | 2/2010 |
| WO | 2011007984 A2 | 1/2011 |

OTHER PUBLICATIONS

3GPP TS 36.321 V10.0.0 (Dec. 2010); 3rd Generation Partnership Project; Technical Specification Group Radio Access Network; Evolved Universal Terrestrial Radio Access (E-UTRA); Medium Access Control (MAC) protocol specification (Release 10).

3GPP TSG RAN Meeting #51; "LTE RAN Enhancements for Diverse Data Applications" Kansas City, USA, Mar. 15-18, 2011; RP-110454.

An Office Action issued by the Korean Patent Office dated Sep. 17, 2014, which corresponds to Korean Patent Application No. 10-2013-7028084 and is related to U.S. Appl. No. 14/470,723; with English language statement of relevance.

The extended European search report issued by the European Patent Office dated Sep. 19, 2014, which corresponds to European Patent Application No. 11863166.2-1855 and is related to U.S. Appl. No. 14/470,723.

Communication pursuant to Rules 70(2) and 70a(2) EPC issued by the European Patent Office dated Oct. 8, 2014, which corresponds to European Patent Application No. 11863166.2-1855 and is related to U.S. Appl. No. 14/470,723.

3GPP; "3rd Generation Partnership Project; Technical Specification Group Radio Access Network; Evolved Universal Terrestrial Radio Access (E-UTRA); Radio Resource Control (RRC); Protocol specification (Release 10)"; 3GPP TS 36.331; Mar. 2011; pp. 1, 2, 37-44, 146-160; V10.1.0.

An Office Action; "Notice of Reasons for Rejection," issued by the Japanese Patent Office dated Nov. 11, 2014, which corresponds to Japanese Patent Application No. 2014-193481 and is related to U.S. Appl. No. 14/470,723; with English language statement of relevance.

* cited by examiner

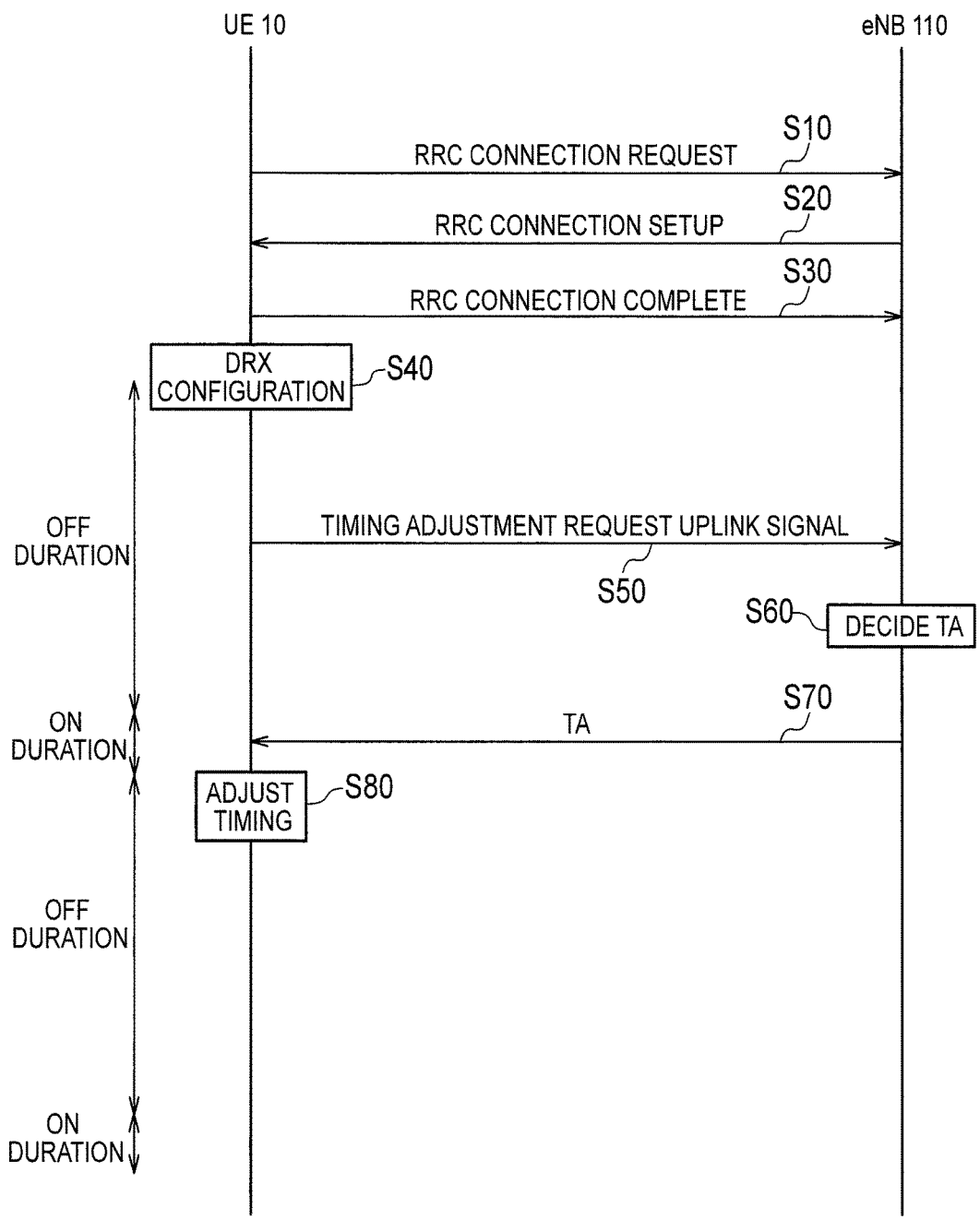

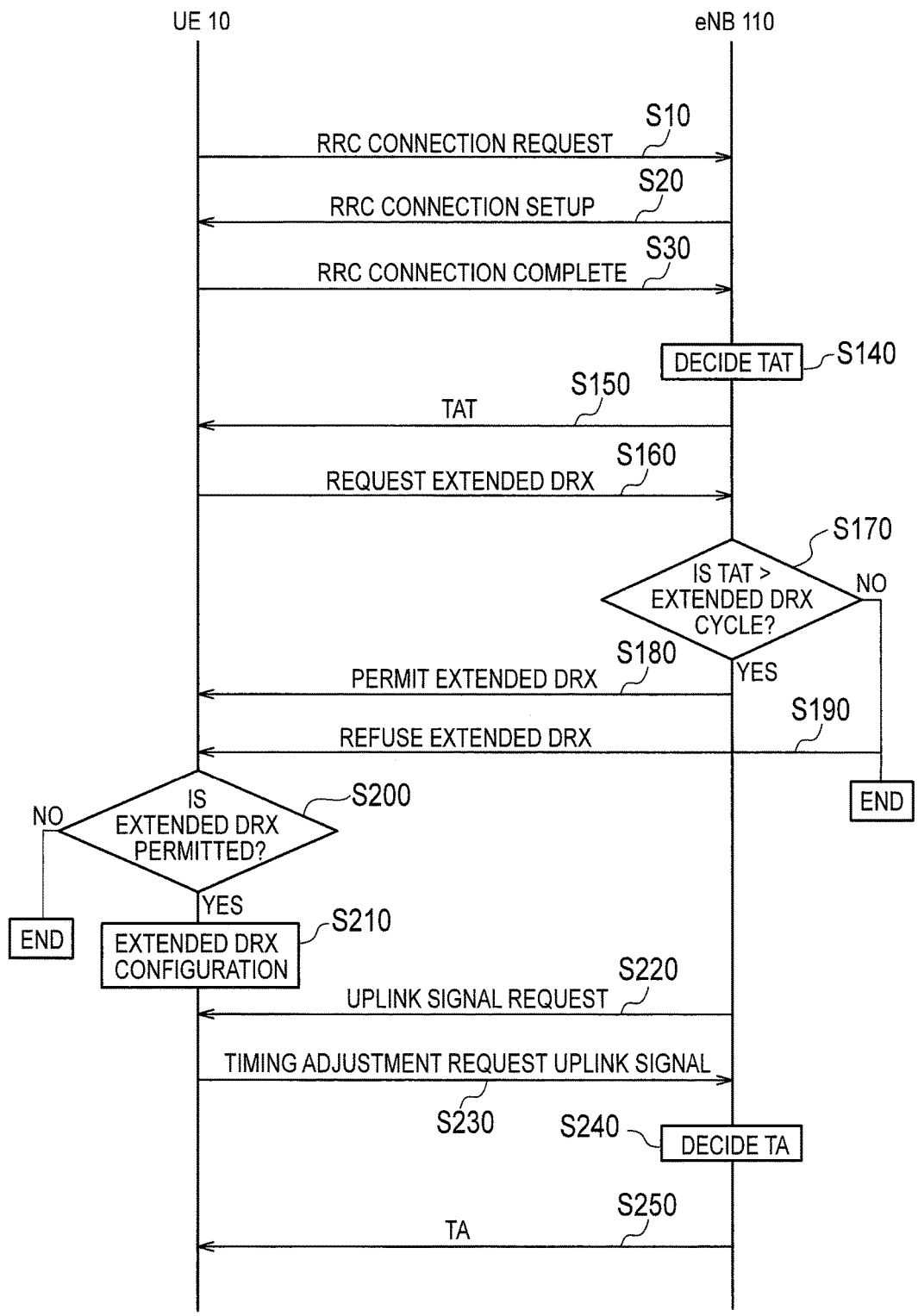

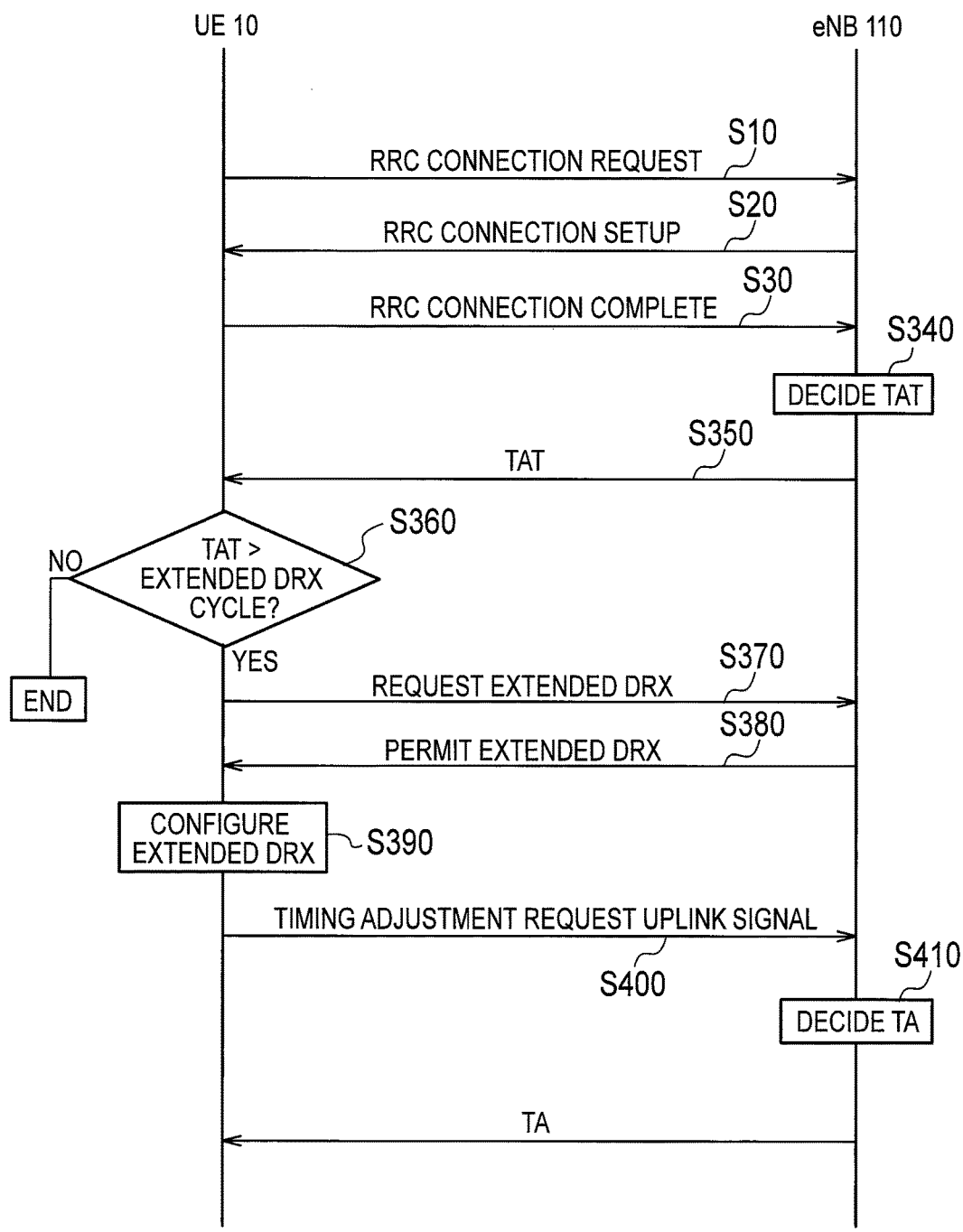

MOBILE COMMUNICATION METHOD AND RADIO TERMINAL

BACKGROUND OF THE INVENTION

1. Field of the Invention

The present invention relates to a mobile communication method, which configures a DRX cycle (a discontinuous reception cycle) having an On duration, in which a downlink signal transmitted from a serving cell is to be monitored, and an Off duration other than the On duration, and a radio terminal.

2. Description of the Related Art

In the next generation communication system such as LTE (Long Term Evolution), in order to reduce the power consumption of a radio terminal, a technology called DRX (Discontinuous Reception) is employed (for example, TS36.321 V10.0.0).

In the DRX, a DRX cycle has an On duration, in which a downlink signal (for example, PDCCH: Physical Downlink Control Channel) transmitted from a serving cell is to be monitored, and an Off duration (Opportunity for DRX) other than the On duration. A radio base station transmits a dedicated signal addressed to a radio terminal only in an On duration of the radio terminal. As described above, the configuration is such that the radio terminal may monitor the downlink signal transmitted from the radio base station, only in the On duration, and may turn off its own receiver in the Off duration. In addition, the DRX cycle may include two cycles (a short DRX cycle and a long DRX cycle). Furthermore, a DRX mode may be configured in the state in which an RRC connection is established between the radio terminal and the radio base station (RRC connected state). That is, it should be noted that the Off duration of the DRX cycle is different from an RRC idle state. In addition, in the 3GPP standard, the long DRX cycle is mandatory and the short DRX cycle is optional.

However, in recent years, there have been increased radio terminals having various applications. The application is configured to periodically transmit and receive a predetermined message such as a keep-alive message or a state update message to/from a communication correspondent such as a server. In such a case, since a control signal is transmitted and received due to the transition toward an RRC state, whenever the predetermined message is transmitted or received, a shortage of a network resource will be caused.

In this regard, in order to suppress the shortage of the network resource, the provision of a DRX cycle (for example, an extended DRX cycle) longer than the existing DRX cycle (for example, the short DRX cycle and the long DRX cycle) (for example, RP-110454) is under consideration.

However, it is assumed that the length of the extended DRX cycle is several seconds or more and the extended DRX cycle is very long as compared with the short DRX cycle, the long DRX cycle and the like. Therefore, the Off duration of the extended DRX cycle is expected to be very long.

Therefore, when the extended DRX cycle is configured, various countermeasures are considered necessary. For example, in a process of aligning the timing at which a radio base station receives an uplink signal from a radio terminal, it is necessary for the radio terminal to receive transmission timing correction information (hereinafter, referred to as TA; Timing Advance) of the uplink signal. However, since the radio terminal receives the TA only in an On duration, an interval for receiving the transmission timing correction information (TA) may exceed an interval (hereinafter, referred to as a maximum TA reception interval) in which the TA is to be received. In such a case, a shift of synchronization in an uplink from the radio terminal may be caused.

SUMMARY OF THE INVENTION

A mobile communication method of a first feature configures a DRX cycle having an On duration in which a downlink signal transmitted from a serving base station is to be monitored and an Off duration other than the On duration in an RRC connected state where an RRC connection is established between a radio terminal and a radio base station. The mobile communication method comprises: a step A of transmitting, from the radio terminal to the radio base station, a timing adjustment request uplink signal through an uplink control channel, even when a radio resource of an uplink data channel has not been assigned in a case where the DRX cycle is configured; and a step B of transmitting, from the radio base station to the radio terminal, transmission timing correction information (TA) of an uplink signal, in response to the timing adjustment request uplink signal.

In the first feature, the step A comprises: a step of transmitting, from the radio terminal to the radio base station, the timing adjustment request uplink signal, when a movement speed of the radio terminal exceeds a predetermined threshold value.

In the first feature, the mobile communication method comprises: a step C of deciding, at the radio base station, a maximum reception interval, in which the transmission timing correction information (TA) is to be received, based on a movement speed of the radio terminal; and a step D of transmitting, from the radio base station to the radio terminal, the maximum reception interval.

In the first feature, the step A comprises: a step of transmitting, from the radio terminal to the radio base station, the timing adjustment request uplink signal, before a reception interval of the transmission timing correction information (TA) exceeds the maximum reception interval.

A radio terminal of a second feature is configured to receive a downlink signal in a mobile communication system, which configures a DRX cycle having an On duration in which the downlink signal transmitted from a serving base station is to be monitored and an Off duration other than the On duration in an RRC connected state where an RRC connection is established between the radio terminal and a radio base station. The radio terminal comprises: a control unit configured to transmit a timing adjustment request uplink signal to the radio base station through an uplink control channel, even when a radio resource of an uplink data channel has not been assigned in a case where the DRX cycle is configured.

BRIEF DESCRIPTION OF THE DRAWINGS

FIG. 8 is a sequence diagram illustrating a mobile communication method according to the first embodiment.

FIG. 9 is a sequence diagram illustrating a mobile communication method according to the first modification.

FIG. 10 is a sequence diagram illustrating a mobile communication method according to the second modification.

DETAILED DESCRIPTION OF THE EMBODIMENTS

A mobile communication system according to an embodiment of the present invention is described below with reference to the drawings. Note that, in the following description of the drawings, same or similar reference signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

[Overview of Embodiment]

A mobile communication method of an embodiment configures a DRX cycle having an On duration in which a downlink signal transmitted from a serving base station is to be monitored and an Off duration other than the On duration in an RRC connected state where an RRC connection is established between a radio terminal and a radio base station. The mobile communication method comprises: a step A of transmitting, from the radio terminal to the radio base station, a timing adjustment request uplink signal through an uplink control channel, even when a radio resource of an uplink data channel has not been assigned in a case where the DRX cycle is configured; and a step B of transmitting, from the radio base station to the radio terminal, transmission timing correction information (TA) of an uplink signal, in response to the timing adjustment request uplink signal.

According to an embodiment, the radio terminal transmits a timing adjustment request uplink signal, even when a radio resource of an uplink data channel is not assigned in the case where a DRX cycle is configured. Consequently, even when a very long DRX cycle is configured, since transmission timing correction information (TA) is transmitted from a radio base station, a shift of synchronization between the radio terminal and the radio base station is suppressed.

According to the embodiment, the radio terminal transmits the timing adjustment request uplink signal through an uplink control channel, in the case where the DRX cycle is configured. Consequently, the shift of the synchronization between the radio terminal and the radio base station is suppressed without releasing the DRX cycle.

[First Embodiment]

(Mobile Communication System)

Figure 1:
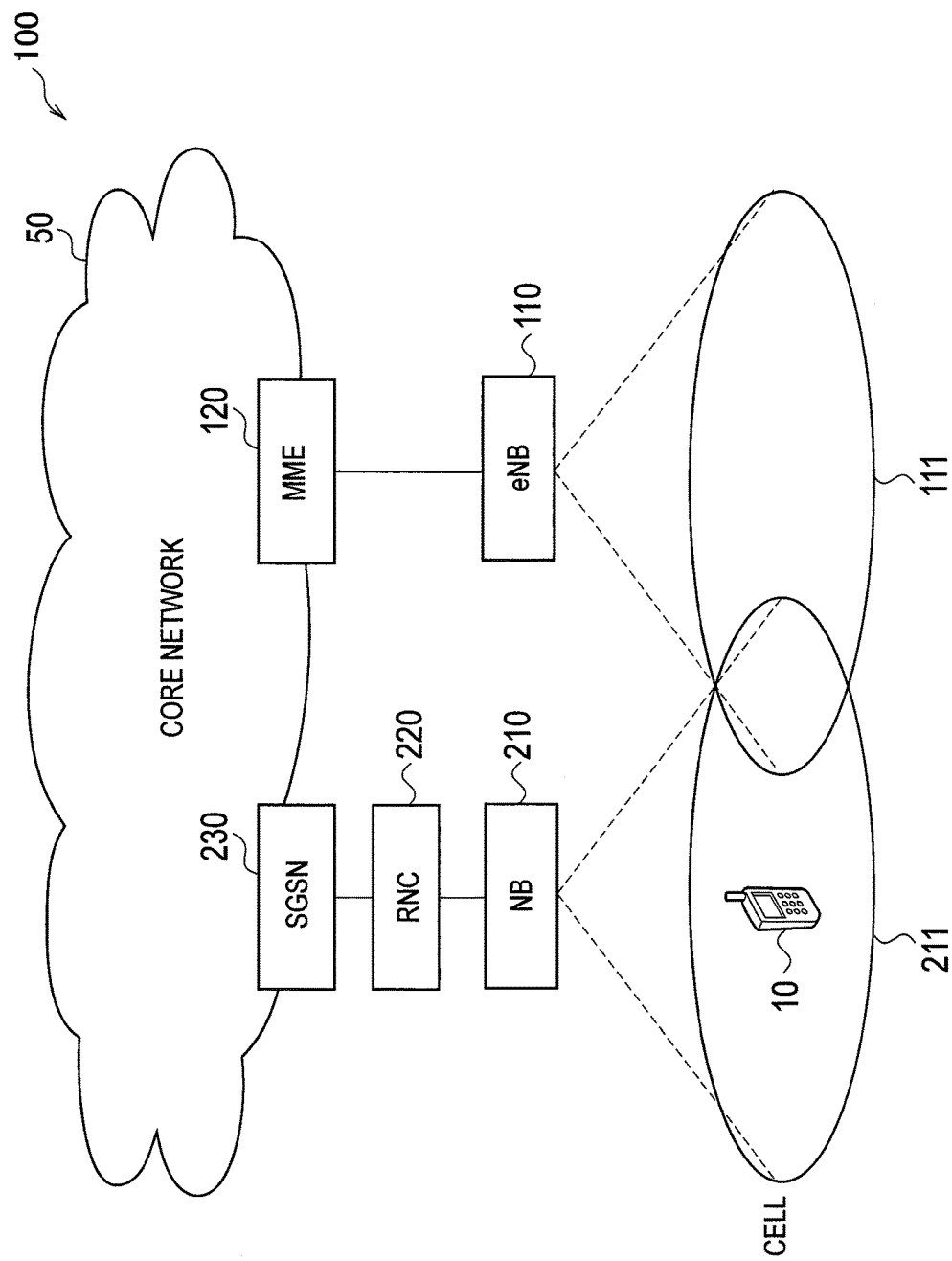
FIG. 1 is a diagram illustrating a mobile communication system 100 according to a first embodiment.

Hereinafter, a mobile communication system according to a first embodiment will be described. FIG. 1 is a diagram illustrating the mobile communication system 100 according to a first embodiment.

As illustrated in FIG. 1, the mobile communication system 100 includes a radio terminal 10 (hereinafter, referred to as UE 10) and a core network 50. Furthermore, the mobile communication system 100 includes a first communication system and a second communication system.

The first communication system, for example, is an LTE (Long Term Evolution)-compatible communication system. The first communication system, for example, includes a radio base station 110 (hereinafter, referred to as eNB 110) and MME 120. In addition, in the first communication system, a first RAT (EUTRAN; Evolved Universal Terrestrial Access Network) is used.

The second communication system, for example, is a WCDMA (Wideband Code Division Multiple Access)-compatible communication system. The second communication system, for example, includes a radio base station 210, RNC 220, and SGSN 230. In addition, in the second communication system, a second RAT (UTRAN; Universal Terrestrial Access Network) is used.

The UE 10 is a device (User Equipment) configured to communicate with the first communication system and the second communication system. For example, the UE 10 has a function of performing radio communication with the eNB 110, and a function of performing radio communication with the radio base station 210.

The eNB 110, having a cell 111, is a device (evolved NodeB) configured to perform radio communication with the UE 10 existing in the cell 111.

The MME 120 is a device (Mobility Management Entity) configured to manage the mobility of the UE 10 which establishes a radio connection with the eNB 110. The MME 120 is provided in the core network 50.

The radio base station 210, having a cell 211, is a device (NodeB) configured to perform radio communication with the UE 10 existing in the cell 211.

The RNC 220, connected to the radio base station 210, is a device (Radio Network Controller) configured to establish a radio connection (RRC Connection) with the UE 10 existing in the cell 211.

The SGSN 230 is a device (Serving GPRS Support Node) configured to perform packet switching in a packet switching domain. The SGSN 230 is provided in the core network 50. Although not illustrated in FIG. 1, a device (MSC; Mobile Switching Center) configured to perform circuit switching in a circuit switching domain may be provided in the core network 50.

Hereinafter, the first communication system will be mainly described. The following description may also be applied to the second communication system. Furthermore, a cell should be understood as a function of performing radio communication with the UE 10. The cell may also be considered as a service area indicating a range communicable with the cell.

Here, in the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, an uplink channel includes an uplink control channel (PUCCH; Physical Uplink Control Channel), an uplink shared channel (PUSCH; Physical Uplink Shared Channel), and the like. Furthermore, a downlink channel includes a downlink control channel (PDCCH; Physical Downlink Control Channel), a downlink shared channel (PDSCH; Physical Downlink Shared Channel), and the like.

The uplink control channel is used to transfer a control signal. The control signal, for example, includes CQI (Channel Quality Indictor), PMI (Precoding Matrix Indicator), RI (Rank Indicator), SR (Scheduling Request), and ACK/NACK.

The CQI is a signal for notifying a recommended modulation scheme and a coding rate to be used in downlink transmission. The PMI is a signal indicating a precoder matrix which is preferably used in downlink transmission. The RI is a signal indicating the number of layers (streams) to be used in downlink transmission. The SR is a signal for requesting the assignment of an uplink radio resource (a resource block which will be described later). The ACK/NACK is a signal indicating whether a signal transmitted through the downlink channel (for example, the PDSCH) has been successfully received.

The uplink shared channel is used to transfer a control signal (includes the above-mentioned control signal) and/or a data signal. For example, the uplink radio resource may be assigned only to the data signal, or assigned such that the data signal and the control signal are multiplexed.

The downlink control channel is used to transfer a control signal. The control signal, for example, includes Uplink SI (Scheduling Information), Downlink SI (Scheduling Information), and a TPC bit.

The Uplink SI is a signal indicating the assignment of the uplink radio resource. The Downlink SI is a signal indicating the assignment of a downlink radio resource. The TPC bit is a signal for instructing increase or decrease in the power of a signal transmitted through the uplink channel.

The downlink shared channel is used to transfer a control signal and/or a data signal. For example, the downlink radio resource may be assigned only to the data signal, or assigned such that the data signal and the control signal are multiplexed.

In addition, a control signal transmitted through the downlink shared channel includes TA (Timing Advance). The TA is transmission timing correction information between the UE 10 and the eNB 110, and is measured by the eNB 110 based on an uplink signal transmitted from the UE 10.

Furthermore, a control signal transmitted through a channel, other than the downlink control channel (the PDCCH) and the downlink shared channel (the PDSCH), includes ACK/NACK. The ACK/NACK is a signal indicating whether a signal transmitted through the uplink channel (for example, the PUSCH) has been successfully received.

(Radio Frame)

Figure 2:
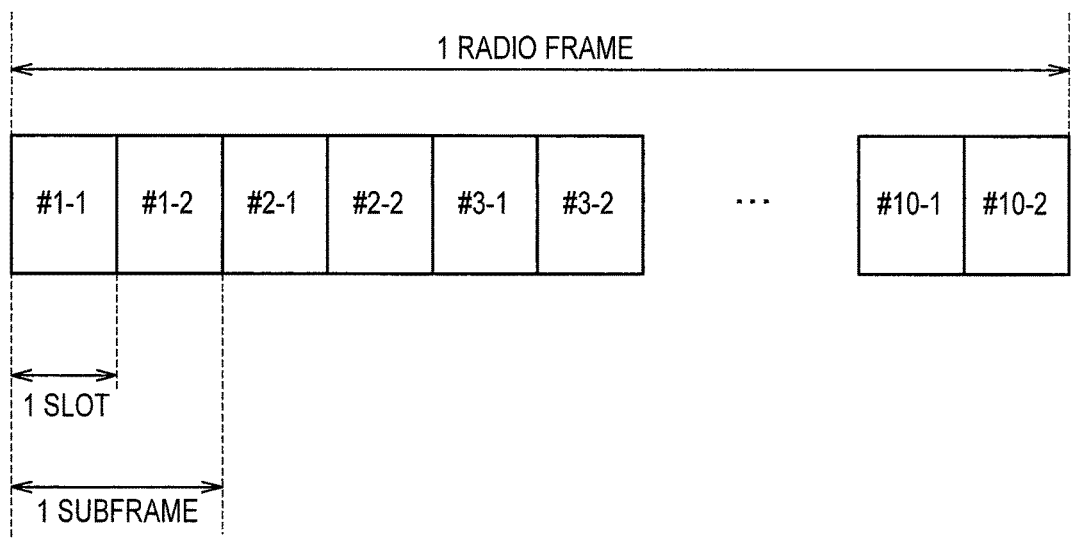
FIG. 2 is a diagram illustrating a radio frame according to the first embodiment.

Hereinafter, a radio frame in the first communication system will be described. FIG. 2 is a diagram illustrating the radio frame in the first communication system.

As illustrated in FIG. 2, one radio frame includes 10 subframes and one subframe includes two slots. One slot has a time length of 0.5 msec, one subframe has a time length of 1 msec, and one radio frame has a time length of 10 msec.

In addition, one slot includes a plurality of OFDM symbols (for example, six OFDM symbols or seven OFDM symbols) in the downward direction. In the same manner, one slot includes a plurality of SC-FDMA symbols (for example, six SC-FDMA symbols or seven SC-FDMA symbols) in the upward direction.

(Radio Resource)

Figure 3:
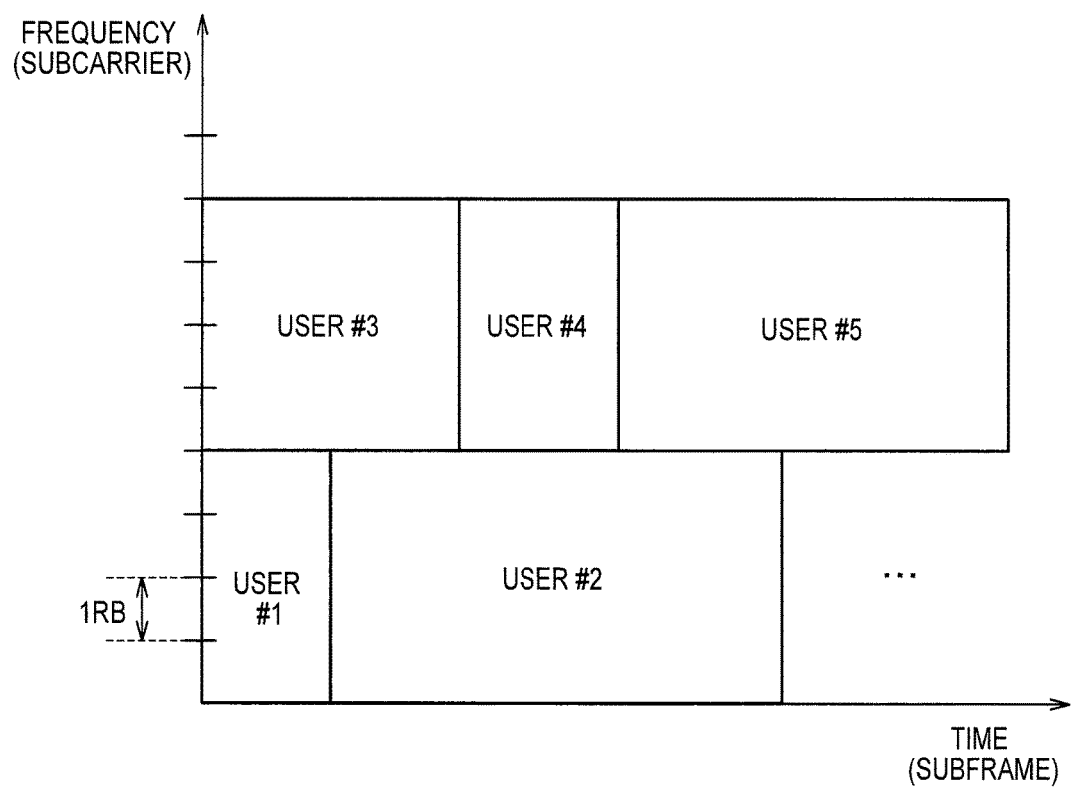
FIG. 3 is a diagram illustrating a radio resource according to the first embodiment.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency includes a plurality of subcarriers, and a predetermined number of subcarriers (12 subcarriers) are collectively called a resource block (RB). A time has a unit, such as the OFDM symbol (or the SC-FDMA symbol), the slot, the subframe, or the radio frame, as described above.

Here, the radio resource is assignable to each resource block. Furthermore, on the frequency axis and the time axis, it is possible to divide the radio resources to assign the same to a plurality of users (for example, user #1 to user #5).

Furthermore, the radio resource is assigned by the eNB 110. The eNB 110 assigns the radio resource to each UE 10 based on the CQI, the PMI, the RI and the like.

(Discontinuous Reception)

Figure 4:
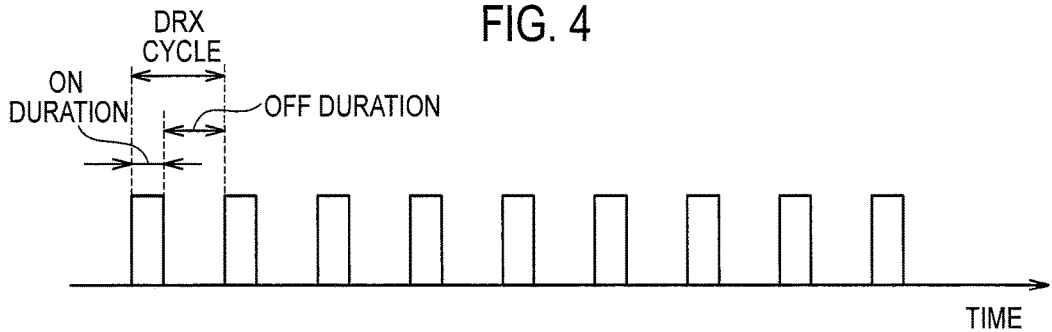
FIG. 4 is a diagram illustrating a short DRX cycle according to the first embodiment.
Figure 5:
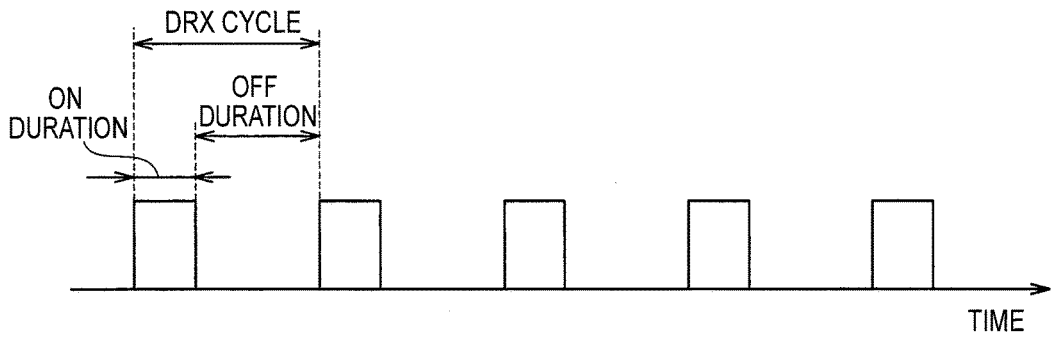
FIG. 5 is a diagram illustrating a long DRX cycle according to the first embodiment.
Figure 6:
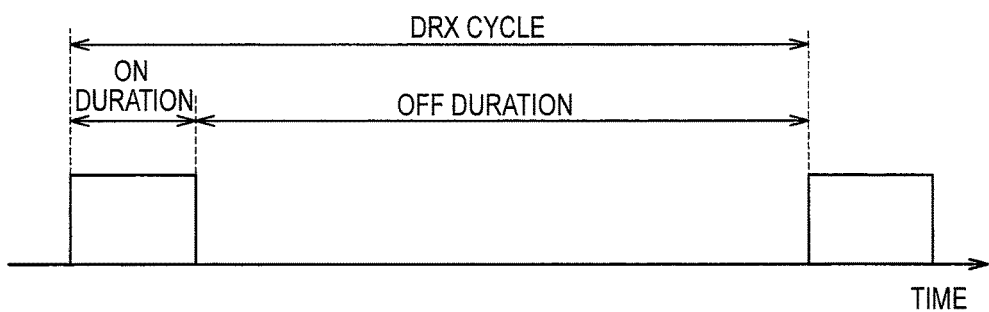
FIG. 6 is a diagram illustrating an extended DRX cycle according to the first embodiment.

Hereinafter, a discontinuous reception (DRX) will be described. FIG. 4 to FIG. 6 are diagrams explaining the discontinuous reception. In order to reduce power consumption, it is possible for the UE 10 to configure the discontinuous reception. Hereinafter, a description will be provided for the case where the discontinuous reception is configured in the state in which an RRC connection is established between the UE 10 and the eNB 110 (an RRC connected state).

As illustrated in FIG. 4 to FIG. 6, according to the discontinuous reception (DRX), a DRX cycle has an On duration, in which a downlink signal transmitted from a serving cell is to be monitored, and an Off duration (Opportunity for DRX) other than the On duration. The eNB 110 transmits a dedicated signal addressed to the UE 10 only in an On duration of the UE 10. As described above, the configuration is such that it suffices to monitor the downlink signal (for example, the PDCCH: Physical Downlink Control Channel), which is transmitted from the eNB 110, only in the On duration, and probably, the UE 10 turns off its own receiver in the Off duration.

In addition, the DRX cycle may include a plurality of types of cycles. Hereinafter, three DRX cycles (a short DRX cycle, a long DRX cycle, and an extended DRX cycle) will be described.

As illustrated in FIG. 4, the short DRX cycle is a short cycle. The length of the short DRX cycle is not particularly limited, and is the order of several milliseconds (for example, 80 msec).

For example, the short DRX cycle is configured according to a command (DRX command) received from the eNB 110. Alternatively, the short DRX cycle is configured when a predetermined period has elapsed after the downlink signal (for example, the PDCCH) is finally received. In addition, since the short DRX cycle is optional, it may not be configured.

As illustrated in FIG. 5, the long DRX cycle is longer than the short DRX cycle. The length of the long DRX cycle is not particularly limited, and is the order of several milliseconds (for example, 160 msec).

For example, when the long DRX cycle is configured, a configuration parameter (DRX Config.) is notified from the eNB 110. The long DRX cycle is configured when a predetermined period has elapsed after the downlink signal (for example, the PDCCH) is finally received. Alternatively, the long DRX cycle is configured when a predetermined period has elapsed after the short DRX cycle is configured.

As illustrated in FIG. 6, the extended DRX cycle is longer than the long DRX cycle. The length of the extended DRX cycle is not particularly limited, and is very longer than the short DRX cycle and the long DRX cycle. For example, the extended DRX cycle is the order of several seconds. For example, the extended DRX cycle is equivalent to a cycle (a Paging Channel Monitoring Cycle), in which a paging signal for notifying that the UE 10 receives an incoming call is monitored, in the state in which the RRC connection has not been established between the UE 10 and the eNB 110 (an RRC idle state). Alternatively, in the RRC idle state, the extended DRX cycle is longer than a cycle in which the paging signal for notifying that the UE 10 receives an incoming call is monitored.

For example, when the extended DRX cycle is configured, a configuration parameter (DRX Config.) is notified from the eNB 110. The extended DRX cycle is configured with the permission of the eNB 110 for a request from the UE 10. Alternatively, the extended DRX cycle is configured when a predetermined period has elapsed after the downlink signal (for example, the PDCCH) is finally received. Alternatively, the extended DRX cycle is configured when a predetermined period has elapsed after the short DRX cycle or the long DRX cycle is configured. Furthermore, in other examples, the UE 10 may recognize a static configuration parameter in advance, and the extended DRX cycle may also be configured with the permission of the eNB 110 for a request from the UE 10.

In addition, with an increase in the number of UEs 10 having various applications, the transition of an RRC state is increased due to an increase in the transmission/reception of a predetermined message. Therefore, since it is estimated that a shortage of a radio resource such as RACH (Random Access Channel) may be caused, the extended DRX cycle is configured in order to suppress the frequent transition of the RRC state in the UE 10 and to suppress the shortage of the network resource. In addition, the predetermined message includes a message, such as a keep-alive message or a state update message, which is transmitted to a communication correspondent from various applications provided in the UE 10.

(Radio Terminal)

Figure 7:
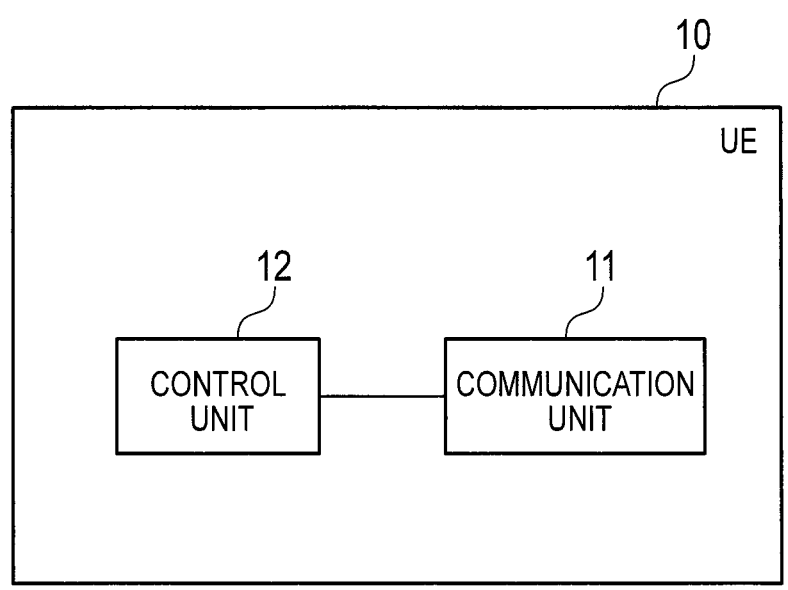
FIG. 7 is a block diagram illustrating UE 10 according to the first embodiment.

Hereinafter, a radio terminal in the first embodiment will be described. FIG. 7 is a block diagram illustrating the UE 10 according to the first embodiment. As illustrated in FIG. 7, the UE 10 includes a communication unit 11 and a control unit 12.

The communication unit 11 receives a signal from the eNB 110 (or the radio base station 210). Alternatively, the communication unit 11 transmits a signal to the eNB 110 (or the radio base station 210). In addition, the communication unit 11, for example, has an antenna (a plurality of antennas when MIMO is used), a demodulation unit, and a modulation unit.

The control unit 12 controls the UE 10. For example, when the discontinuous reception (DRX) is configured, the control unit 12 controls the on/off of the communication unit 11. That is, in the On duration in which the downlink signal transmitted from the serving cell is to be monitored, the control unit 12 turns on the communication unit 11 and monitors the downlink signal (for example, the PDCCH) transmitted from the eNB 110. In the Off duration other than the On duration in which the downlink signal transmitted from the serving cell is to be monitored, the control unit 12 turns off the communication unit 11 and does not monitor the downlink signal (for example, the PDCCH) transmitted from the eNB 110.

Specifically, in the case where the DRX cycle is configured, even when a radio resource of the uplink data channel (for example, the PDSCH) has not been assigned, the control unit 12 transmits a timing adjustment request uplink signal to the eNB 110 through the uplink control channel (for example, the PDCCH).

Here, the timing adjustment request uplink signal may be a pseudo signal (random information, zero information) which is added to the existing control signal (for example, the CQI, the PMI, the RI, and the SRS). Alternatively, the timing adjustment request uplink signal may be a pseudo signal (random information, zero information) which is newly defined.

Furthermore, the timing adjustment request uplink signal is used when the eNB 110 measures a propagation delay time between the UE 10 and the eNB 110. In other words, the timing adjustment request uplink signal is a signal requesting the eNB 110 to transmit transmission timing correction information (TA; Timing Advance).

If the transmission timing correction information (TA) is received from the eNB 110, the control unit 12 adjusts a transmission timing of an uplink signal. The transmission timing, for example, is adjusted with the accuracy of 16×Ts (0.52 μseconds). In addition, the Ts is a basic unit time in the LTE, and for example, 1/(15000×2048) second. Here, it should be noted to determine a maximum TA reception interval in which the transmission timing correction information (TA) is to be received. For example, the maximum TA reception interval may be decided by the eNB 110, and transmitted from the eNB 110 to the UE 10. Alternatively, the maximum TA reception interval may be decided by the UE 10. For example, the maximum TA reception interval is decided based on the movement speed of the UE 10. Specifically, as the movement speed of the UE 10 is slower, a longer time is decided as the maximum TA reception interval.

Here, the control unit 12 has a predetermined timer (TimingAlignmentTimer) for monitoring an interval in which the transmission timing correction information (TA) is received. If the transmission timing correction information (TA) is received, the control unit 12 sets the maximum TA reception interval to the predetermined timer. Thus, when the timer set with the maximum TA reception interval has expired, the control unit 12 determines that a shift of synchronization between the UE 10 and the eNB 110 is caused. In other words, if an interval of the transmission timing correction information (TA) continuously received from the eNB 110 exceeds the maximum TA reception interval, the control unit 12 determines that the shift of the synchronization between the UE 10 and the eNB 110 is caused.

Here, before the predetermined timer with the set maximum TA reception interval is expired, it is preferable that the control unit 12 transmits the timing adjustment request uplink signal to the eNB 110.

In addition, the control unit 12 may transmit the timing adjustment request uplink signal to the eNB 110 in a predetermined cycle. Alternatively, when the movement speed of the UE 10 exceeds a predetermined threshold value, the control unit 12 may transmit the timing adjustment request uplink signal to the eNB 110.

In addition, the movement speed of the UE 10 may be measured by the number of handovers in a predetermined time. Alternatively, when the UE 10 has GPS (Global Positioning System), the movement speed of the UE 10 may be measured using the GPS. Alternatively, when the UE 10 has an acceleration sensor, the movement speed of the UE 10 may also be measured using the acceleration sensor.

(Mobile Communication Method)

Hereinafter, a mobile communication method in the first embodiment will be described. FIG. 8 is a sequence diagram illustrating the mobile communication method according to the first embodiment.

As illustrated in FIG. 8, in step 10, the UE 10 transmits a connection request (RRC Connection Request) to the eNB 110.

In step 20, the eNB 110 transmits a connection setup (RRC Connection Setup) to the UE 10.

In step 30, the UE 10 transmits a connection complete (RRC Connection Complete) to the eNB 110.

In step 40, the UE 10 configures DRX. For example, the UE 10 configures an extended DRX cycle.

In step 50, the UE 10 transmits the timing adjustment request uplink signal to the eNB 110 through the uplink control channel (for example, the PUSCH) even when a radio resource of the uplink data channel (for example, the PUSCH) has not been assigned. Here, as an example, a description will be provided for the case where the timing adjustment request uplink signal is transmitted to the eNB 110 in a duration (that is, the Off duration) other than the On duration, in which the downlink signal transmitted from the serving cell is to be monitored.

In addition, the UE 10 may transmit the timing adjustment request uplink signal to the eNB 110 in a predetermined cycle. Alternatively, when the movement speed of the UE 10 exceeds a predetermined threshold value, the UE 10 may also transmit the timing adjustment request uplink signal to the eNB 110.

In step 60, the eNB 110 decides transmission timing correction information (that is, the TA; Timing Advance) between the UE 10 and the eNB 110 according to the reception timing of the timing adjustment request uplink signal.

In step 70, the eNB 110 transmits the transmission timing correction information (TA) decided in step 60 to the UE 10. In addition, since the DRX is configured, it is preferable that the eNB 110 transmits the transmission timing correction information (TA) in the On duration.

In step 80, the UE 10 adjusts the transmission timing of an uplink signal based on the transmission timing correction information (TA) received from the eNB 110. In addition, the transmission timing, for example, is adjusted with the accuracy of 16×Ts (0.52 μseconds) as described above.

(Operation and Effect)

According to the first embodiment, in the case where the DRX cycle is configured, even when the radio resource of the uplink data channel has not been assigned, the UE 10 transmits the timing adjustment request uplink signal. Consequently, even when a very long DRX cycle is configured, the transmission timing correction information (TA) is transmitted from the eNB 110, so that the shift of the synchronization between the UE 10 and the eNB 110 is suppressed.

According to the first embodiment, in the case where the DRX cycle is configured, the UE 10 transmits the timing adjustment request uplink signal through the uplink control channel. Consequently, the transmission timing correction information (TA) is transmitted from the eNB 110, so that the shift of the synchronization between the UE 10 and the eNB 110 is suppressed without releasing the DRX cycle.

According to the first embodiment, the maximum TA reception interval is decided based on the movement speed of the UE 10. Thus, the probability of the determination may be reduced that the shift of the synchronization between the UE 10 and the eNB 110 is caused.

According to the first embodiment, when the movement speed of the UE 10 exceeds a predetermined threshold value, the UE 10 transmits the timing adjustment request uplink signal to the eNB 110. In other words, only when there is a possibility to occur the shift of the reception timing of the uplink signal at the eNB 110, the UE 10 transmits the timing adjustment request uplink signal. Consequently, it is possible to suppress the waste of a radio resource due to the transmission of the timing adjustment request uplink signal.

[First Modification]

Hereafter, a first modification of the first embodiment is explained. Hereinafter, a difference relative to the first embodiment will be mainly described.

According to the first modification, a description will be provided for the case where a process of adjusting the transmission timing of an uplink signal is essential in the eNB 110, and an extended DRX cycle is set led by the eNB 110.

In such a case, (1-1) when there is one type of extended DRX cycle, if an adjustment cycle (that is, a maximum TA reception interval in which transmission timing correction information (TA) is to be received) to adjust the transmission timing of the uplink signal is longer than the extended DRX cycle, the eNB 110 is configured to permit the setting of the extended DRX cycle. Alternatively, when an interval corresponding to n times (n is a real number of 1 or more) as long as the maximum TA reception interval is longer than the extended DRX cycle, the eNB 110 may also be configured to permit the setting of the extended DRX cycle.

In addition, the reception interval of the transmission timing correction information (TA) is monitored by a predetermined timer (TimingAlignmentTimer), and if the transmission timing correction information (TA) is received, the maximum TA reception interval is set to the predetermined timer. Thus, when the timer with the set maximum TA reception interval has expired, it is determined that the shift of the synchronization between the UE 10 and the eNB 110 may be caused.

Alternatively, (1-2) when there are a plurality of types of extended DRX cycles, if the maximum TA reception interval is longer than a cycle (the extended DRX cycle) requested from the UE 10, the eNB 110 is configured to permit the setting of the extended DRX cycle. Alternatively, when an interval corresponding to n times (n is a real number of 1 or more) as long as the maximum TA reception interval is longer than the cycle (the extended DRX cycle) requested from the UE 10, the eNB 110 may also be configured to permit the setting of the extended DRX cycle.

Based on the above fact, before the predetermined timer (the TimingAlignmentTimer) is expired, the UE 10 transmits the uplink signal. The uplink signal may be autonomously transmitted by the UE 10, or may be transmitted by the UE 10 according to an instruction of the eNB 110.

(Mobile Communication Method)

Hereinafter, a mobile communication method in the first modification will be described. FIG. 9 is a sequence diagram illustrating the mobile communication method according to the first modification.

As illustrated in FIG. 9, in step 10, the UE 10 transmits a connection request (RRC connection request) to the eNB 110.

In step 20, the eNB 110 transmits a connection setup (RRC Connection Setup) to the UE 10.

In step 30, the UE 10 transmits a connection complete (RRC Connection Complete) to the eNB 110.

In step 140, the eNB 110 decides a maximum TA reception interval (TAT in FIG. 9). For example, the maximum TA reception interval is decided based on the movement speed of the UE 10.

In step 150, the eNB 110 transmits the maximum TA reception interval (the TAT in FIG. 9) decided in step 140 to the UE 10.

In step 160, the UE 10 transmits an extended DRX request for requesting the setting of an extended DRX cycle to the eNB 110. In addition, when there are a plurality of types of extended DRX cycles, the UE 10 may allow the cycle of the extended DRX cycle selected by the UE 10 to be included in the extended DRX request.

In step 170, the eNB 110 determines whether to permit the setting of the extended DRX cycle. Specifically, the eNB 110 determines whether the maximum TA reception interval (or an interval corresponding to n times (n is a real number of 1 or more) as long as the maximum TA reception interval) is longer than the extended DRX cycle. When the eNB 110 permits the setting of the extended DRX cycle, the eNB 110 proceeds to the process of step 180. Meanwhile, when the eNB 110 refuses the setting of the extended DRX cycle, the eNB 110 performs the process of step 190 and completes a series of processes.

In step 180, the eNB 110 transmits extended DRX permission for permitting the setting of the extended DRX cycle to the UE 10.

In step 190, the eNB 110 transmits extended DRX refusal for refusing the setting of the extended DRX cycle to the UE 10.

In step 200, the UE 10 determines whether the setting of the extended DRX cycle has been permitted. When the setting of the extended DRX cycle has been permitted, the UE 10 proceeds to the process of step 210. When the setting of the extended DRX cycle is refused, the UE 10 completes a series of processes.

In step 210, the UE 10 configures the extended DRX cycle.

In step 220, the eNB 110 transmits an uplink signal request for requesting an uplink signal to the UE 10. For example, the uplink signal request is transmitted through PUCCH.

In step 230, the UE 10 transmits the uplink signal, which has been requested by the eNB 110, to the eNB 110.

In step 240, the eNB 110 decides transmission timing correction information (TA) between the UE 10 and the eNB 110, according to the reception timing of the uplink signal.

In step 250, the eNB 110 transmits the transmission timing correction information (TA) decided in step 240 to the UE 10. In addition, since the DRX is configured, it is preferable that the eNB 110 transmits the transmission timing correction information (TA) in the On duration.

In addition, the UE 10 adjusts the transmission timing of the uplink signal based on the transmission timing correction information (TA) received from the eNB 110.

[Second Modification]

Hereinafter, a second modification of the first embodiment will be described. Hereinafter, a difference relative to the first embodiment will be mainly described.

According to the second modification, a description will be provided for the case where a process of adjusting the transmission timing of an uplink signal is not essential in the eNB 110, and an extended DRX cycle is set led by the UE 10.

In such a case, (2-1) when there is one type of extended DRX cycle, if an adjustment cycle (that is, a maximum TA reception interval in which transmission timing correction information (TA) is to be received) to adjust the transmission timing of the uplink signal is longer than the extended DRX cycle, the UE 10 requests the eNB 110 to set the extended DRX cycle. Alternatively, when an interval corresponding to n times (n is a real number of 1 or more) as long as the maximum TA reception interval is longer than the extended DRX cycle, the UE 10 may also be configured to request the eNB 110 to set the extended DRX cycle.

Alternatively, (2-1) when there are a plurality of types of extended DRX cycles, if the maximum TA reception interval is longer than the extended DRX cycle selected by the UE 10, the UE 10 requests the eNB 110 to set the extended DRX cycle. Alternatively, when an interval corresponding to n times (n is a real number of 1 or more) as long as the maximum TA reception interval is longer than the extended DRX cycle selected by the UE 10, the UE 10 may also be configured to request the eNB 110 to set the extended DRX cycle.

Based on the above fact, before a predetermined timer (TimingAlignmentTimer) is expired, the UE 10 transmits a timing adjustment request uplink signal. The timing adjustment request uplink signal may be autonomously transmitted by the UE 10, or may be transmitted by the UE 10 according to an instruction of the eNB 110.

(Mobile Communication Method)

Hereinafter, the mobile communication method in the second modification will be described. FIG. 10 is a sequence diagram illustrating the mobile communication method according to the second modification.

As illustrated in FIG. 10, in step 10, the UE 10 transmits a connection request (RRC Connection Request) to the eNB 110.

In step 20, the eNB 110 transmits a connection setup (RRC Connection Setup) to the UE 10.

In step 30, the UE 10 transmits a connection complete (RRC Connection Complete) to the eNB 110.

In step 340, the eNB 110 decides a maximum TA reception interval (TAT in FIG. 9). For example, the maximum TA reception interval is decided based on the movement speed of the UE 10.

In step 350, the eNB 110 transmits the maximum TA reception interval (the TAT in FIG. 10) decided in step 140 to the UE 10.

In step 360, the UE 10 determines whether to request the setting of the extended DRX cycle. Specifically, the UE 10 determines whether the maximum TA reception interval (or an interval corresponding to n times (n is a real number of 1 or more) as long as the maximum TA reception interval) is longer than the extended DRX cycle. When requesting the setting of the extended DRX cycle, the UE 10 proceeds to the process of step 360. Meanwhile, when not requesting the setting of the extended DRX cycle, the eNB 110 completes a series of processes.

In step 370, the UE 10 transmits an extended DRX request for requesting the setting of the extended DRX cycle to the eNB 110. In addition, when there are a plurality of types of extended DRX cycles, the UE 10 may allow the cycle of the extended DRX cycle selected by the UE 10 to be included in the extended DRX request.

In step 380, the eNB 110 transmits extended DRX permission for permitting the setting of the extended DRX cycle to the UE 10.

In step 390, the UE 10 configures the extended DRX cycle.

In step 400, even when a radio resource of an uplink data channel (for example, PUSCH) has not been assigned, the UE 10 transmits a timing adjustment request uplink signal to the eNB 110 through an uplink control channel (for example, PUCCH).

In step 410, the eNB 110 decides transmission timing correction information (TA) between the UE 10 and the eNB 110, according to the reception timing of the timing adjustment request uplink signal.

In step 250, the eNB 110 transmits the transmission timing correction information (TA) decided in step 240 to the UE 10. In addition, since the DRX is configured, it is preferable that the eNB 110 transmits the transmission timing correction information (TA) in the On duration.

In addition, the UE 10 adjusts the transmission timing of the uplink signal based on the transmission timing correction information (TA) received from the eNB 110.

[Other Embodiments]

The present invention is explained through the above embodiment, but it must not be understood that this invention is limited by the statements and the drawings constituting a part of this disclosure. From this disclosure, a variety of alternate embodiments, examples, and applicable techniques will become apparent to one skilled in the art.

Though particularly not mentioned in the embodiment, a configuration for transmitting the timing adjustment request uplink signal is transmitted from the eNB 110 to the UE 10 before a DRX cycle is configured. The configuration for transmitting the timing adjustment request uplink signal, for example, includes conditions (for example, a predetermined threshold value to be compared with a movement speed) for transmitting the timing adjustment request uplink signal and a transmission cycle for transmitting the timing adjustment request uplink signal. The configuration for transmitting the timing adjustment request uplink signal, for example, may be notified to the UE 10 through RRC signaling, or may be notified to the UE 10 through a broadcast channel. The broadcast channel is broadcasted from the eNB 110 and transfers MIB (Master Information Block) or SIB (System Information Block).

According to an example, when a DRX cycle (specifically, an extended DRX cycle) is configured, there is considered a case where a setting request of the DRX cycle is transmitted from the UE 10 to the eNB 110 and setting permission of the DRX cycle is transmitted from the eNB 110 to the UE 10. In such a case, it is considered that a configuration for transmitting the timing adjustment request uplink signal is included in the setting permission transmitted from the eNB 110 to the UE 10.

Particularly not mentioned in the embodiment, the transmission timing of the timing adjustment request uplink signal may be decided according to a maximum TA reception interval and an extended DRX cycle. That is, the transmission timing of the timing adjustment request uplink signal is decided such that transmission timing correction information (TA) can be received from the eNB 110 in an On duration. For example, the transmission timing of the timing adjustment request uplink signal is earlier than the start timing of the On duration by a predetermined time. The transmission timing of the timing adjustment request uplink signal may be decided by the eNB 110 or the UE 10.

Particularly not mentioned in the embodiment, when release conditions for releasing the extended DRX cycle are satisfied, the extended DRX cycle may be released. In addition, for the release of the extended DRX cycle, the eNB 110 may instruct the UE 10 to release the extended DRX cycle, or the UE 10 may request the eNB 110 to release the extended DRX cycle.

The release condition is that the movement speed of the UE 10 is increased such that the maximum TA reception interval is not appropriate, that is, the movement speed of the UE 10 exceeds a predetermined threshold value determined by the maximum TA reception interval. Alternatively the release condition is that it is not possible to set the maximum TA reception interval, in which the extended DRX cycle is configurable, as a value of a predetermined timer (TimingAlignmentTimer). Alternatively the release condition is that the eNB 110 determines that the transmission timing of an uplink signal is out of a predetermined range. Alternatively the release condition is that a variation amount in TA continuously received in the UE 10 from the eNB 110 is larger than a predetermined threshold value.

What is claimed is:

1. A mobile communication method, which configures a discontinuous reception (DRX) cycle having an On duration in which a downlink signal transmitted from a radio base station is to be monitored and an Off duration other than the On duration in a radio resource control (RRC) connected state where a RRC connection is established between a radio terminal and the radio base station, the mobile communication method comprising:

transmitting, from the radio terminal to the radio base station, first information indicating that the radio terminal gives priority to configurations for improved power savings of the radio terminal, in response to when the radio terminal gives priority to the configurations for improved power savings in the RRC connected state, and transmitting, from the radio terminal to the radio base station, second information indicating that the radio terminal does not give priority to the configurations for improved power savings of the radio terminal, in response to when the radio terminal does not give priority to the configurations for improved power savings in the RRC connected state, wherein the first information, when transmitted to the radio base station, is used by the radio base station to configure parameters on the RRC connected state to the radio terminal, the first information includes information indicating a first DRX cycle which the user terminal desires to be configured to itself, and the Off duration of the first DRX cycle is greater than the Off duration of a second DRX cycle which is currently configured to the user terminal, the second information, when transmitted to the radio base station, is used by the radio base station to configure parameters on the RRC connected state to the radio terminal, and the configurations for improved power saving comprise a configuration in which the Off duration of a DRX cycle is increased relative to the Off duration of a DRX cycle presently used by the radio terminal.

2. A radio terminal configured to receive a downlink signal in a mobile communication system, which configures a discontinuous reception (DRX) cycle having an On duration in which the downlink signal transmitted from a radio base station is to be monitored and an Off duration other than the On duration in a radio resource control (RRC) connected state where a RRC connection is established between the radio terminal and the radio base station, the radio terminal comprising:

a transmitter configured to:

transmit, to the radio base station, first information indicating that the radio terminal gives priority to configurations for improved power savings of the radio terminal, when the radio terminal gives priority to the configurations for the improved power savings in the RRC connected state, and transmit, to the radio base station, second information indicating that the radio terminal does not give priority to the configurations for improved power savings of the radio terminal, when the radio terminal does not give priority to the configurations for improved power savings in the RRC connected state; wherein the first information, when transmitted to the radio base station, is used by the radio base station to configure parameters on the RRC connected state to the radio terminal, the first information includes information indicating a first DRX cycle which the user terminal desires to be configured to itself, and the Off duration of the first DRX cycle is greater than the Off duration of a second DRX cycle which is currently configured to the user terminal, the second information, when transmitted to the radio base station, is used by the radio base station to configure parameters on the RRC connected state to the radio terminal, and the configurations for improved power saving comprise a configuration in which the Off duration of a DRX cycle is increased relative to the Off duration of a DRX cycle presently used by the radio terminal.

3. A device installed in a radio terminal configured to receive a downlink signal in a mobile communication system, which configures a discontinuous reception (DRX) cycle having an On duration in which the downlink signal transmitted from a radio base station is to be monitored and an Off duration other than the On duration in a radio resource control (RRC) connected state where a RRC connection is established between the radio terminal and the radio base station, the device comprising a processor and a memory, the processor configured to:

transmit, to the radio base station, first information indicating that the radio terminal gives priority to configurations for improved power savings of the radio terminal, when the radio terminal gives priority to the configurations for improved power savings in the RRC connected state, transmit, to the radio base station, second information indicating that the radio terminal does not give priority to the configurations for improved power savings of the radio terminal, when the radio terminal does not give priority to the configurations for improved power savings in the RRC connected state; wherein the first information, when transmitted to the radio base station, is used by the radio base station to configure parameters on the RRC connected state to the radio terminal, the first information includes information indicating a first DRX cycle which the user terminal desires to be configured to itself, and the Off duration of the first DRX cycle is greater than the Off duration of a second DRX cycle which is currently configured to the user terminal, the second information, when transmitted to the radio base station, is used by the radio base station to configure parameters on the RRC connected state to the radio terminal, and the configurations for improved power saving comprise a configuration in which the Off duration of a DRX cycle is increased relative to the Off duration of a DRX cycle presently used by the radio terminal.

\* \* \* \* \*